G. H. DYER.
Implement for Holding Hot Corn.
No. 211,388.  Patented Jan. 14, 1879.
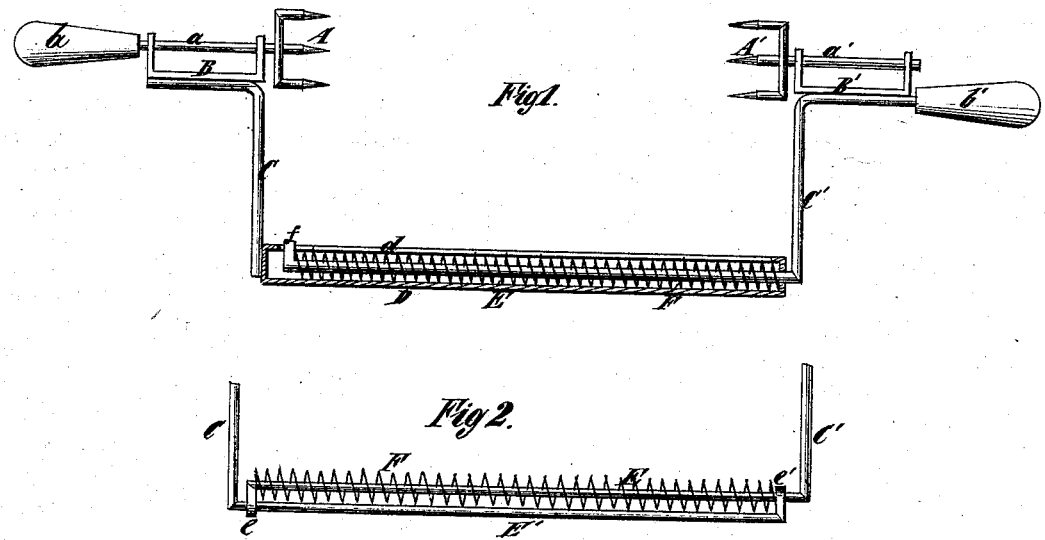
Witnesses:
Chandler Hall
Thomas E. Birch
Inventor:
Geo. H. Dyer

UNITED STATES PATENT OFFICE.

GEORGE H. DYER, OF NEW YORK, N. Y.

IMPROVEMENT IN IMPLEMENTS FOR HOLDING HOT CORN.

Specification forming part of Letters Patent No. 211,388, dated January 14, 1879; application filed July 27, 1878.

*To all whom it may concern:*

Be it known that I, GEORGE H. DYER, of the city, county, and State of New York, have invented certain new and useful Improvements in Implements for Holding Ears of Corn, of which the following is a specification:

My improvements are embodied in an implement for holding ears of corn while eating the corn from the ear; and consists in the combination, with forks or points for entering the ends of the ears, of a cross-bar, preferably adjustable, whereby the ears of different lengths may be held in the implement.

It also consists in details of construction to be hereinafter explained.

In the accompanying drawings, Figure 1 represents a side view, partly in section, of my improved implement, and Fig. 2 a side view of a portion of one of slightly-modified form.

Similar letters of reference designate corresponding parts in both figures.

A A' designate the forks for insertion in the ends of the ear for holding it. They are represented as having several points and as attached to shafts or spindles $a$ $a'$, which are held in suitable bearings B B', supported on uprights C C'. One of these uprights, C, is rigidly connected to a tube, D, while the other, C', terminates in a long rod, E, which passes loosely through the tube D, and the end of which is turned up, so as to form a projecting finger, $f$, which is guided in a slot, $d$, in the tube D, whereby the two uprights are kept in the same plane.

A spring, F, may be interposed between the finger $f$ and the end of the tube D, to enable the uprights to be drawn apart to accommodate ears of different lengths and still insure the forks or points securely entering the ends of the ear.

If desirable, the tube D may be made smaller and fitting more closely to the rod E, wherein it may slide, and a set-screw may be employed for holding it in position.

The implement is held in the hands by the handles $b$ $b'$. The handle $b$ is attached to the shaft or spindle $a$, while the handle $b'$ is attached to the upright C'; hence by turning the handle $b$ the ear of corn is rotated and different parts thereof are presented, in turn, to the eater.

If desirable, the uprights C C' may be combined with cross-rods E E', (see Fig. 2,) which are provided with eyes $e$ $e'$, for holding them together, and preferably a spring, F, for holding the uprights against any force tending to pull them apart.

What I claim as my invention, and desire to secure by Letters Patent, is—

1. In an instrument for holding an ear of corn, the combination, with two forks or points, of an adjustable cross-bar uniting them, whereby the implement may serve for holding ears of different lengths, substantially as specified.

2. In an implement for holding an ear of corn, the combination, with two forks or points, of a spring for holding them firmly against the ends of an ear, substantially as specified.

3. The combination of the forks A A', uprights C C', tube D, rod E, and spring F, substantially as and for the purpose specified.

GEO. H. DYER.

Witnesses:
   A. J. DE LACY,
   C. SCRANTON.